(12) United States Patent
Bhatkar et al.

(10) Patent No.: US 11,184,162 B1
(45) Date of Patent: Nov. 23, 2021

(54) PRIVACY PRESERVING SECURE TASK AUTOMATION

(71) Applicant: SYMANTEC CORPORATION, Mountain View, CA (US)

(72) Inventors: Sandeep Bhatkar, Sunnyvale, CA (US); Susanta K. Nanda, San Jose, CA (US); Yuqiong Sun, Mountain View, CA (US); Saurabh Shintre, Sunnyvale, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 488 days.

(21) Appl. No.: 16/147,014

(22) Filed: Sep. 28, 2018

(51) Int. Cl.
*H04L 9/08* (2006.01)
*G06F 9/48* (2006.01)
*H04L 9/14* (2006.01)
*G06F 16/22* (2019.01)

(52) U.S. Cl.
CPC ............ *H04L 9/085* (2013.01); *G06F 9/4881* (2013.01); *G06F 16/22* (2019.01); *H04L 9/14* (2013.01)

(58) Field of Classification Search
CPC . H04L 9/085; H04L 9/14; G06F 16/22; G06F 9/4881
USPC ........................................................ 713/170
See application file for complete search history.

(56) References Cited

U.S. PATENT DOCUMENTS

| | | | | |
|---|---|---|---|---|
| 8,549,287 B2* | 10/2013 | Sarkkinen | ............. | H04L 63/104 713/163 |
| 8,613,070 B1* | 12/2013 | Borzycki | ................ | H04L 67/10 726/8 |
| 9,466,086 B2* | 10/2016 | McEachern | ............ | G06Q 10/10 |
| 9,871,656 B2* | 1/2018 | Yao | ........................ | H04L 9/0643 |
| 10,057,061 B1* | 8/2018 | Maeng | .............. | H04W 12/0431 |
| 10,454,899 B1* | 10/2019 | Gabrielson | ........... | H04L 9/3268 |
| 10,739,733 B1* | 8/2020 | Saxena | ................ | G05B 19/042 |
| 10,764,752 B1* | 9/2020 | Avetisov | ................. | H04L 63/18 |

(Continued)

OTHER PUBLICATIONS

Fernandes, Earlence, Amir Rahmati, Jaeyeon Jung, and Atul Prakash. "Decoupled-ifttt: Constraining privilege in trigger-action platforms for the internet of things." arXiv preprint arXiv: 1707.00405 (2017). (Year: 2017) (Year: 2017).*

(Continued)

*Primary Examiner* — Luu T Pham
*Assistant Examiner* — Walter J Malinowski
(74) *Attorney, Agent, or Firm* — Maschoff Brennan

(57) ABSTRACT

Privacy preserving secure task automation. A method may include generating, by a first section of a platform, a pair of encryption keys (private and shared secret keys); receiving, by a second section of the platform, platform user data, trigger service user data; and action service user data, wherein the user of the services and platform are the same; sending the shared secret key to the services; storing the private key in the first section; receiving from the trigger service, by the second section, a first communication encrypted with the shared secret key, regarding occurrence of a trigger; determining, by the first section, that the trigger corresponds to the user of the platform; encrypting a second message with the shared secret key, requesting invocation of the action based on the trigger; and transmitting the second encrypted message to the action service without the data related to the user of the platform.

17 Claims, 5 Drawing Sheets

(56) References Cited

U.S. PATENT DOCUMENTS

| | | | |
|---|---|---|---|
| 2002/0067832 A1* | 6/2002 | Jablon | H04L 9/085 380/277 |
| 2002/0138582 A1* | 9/2002 | Chandra | G06Q 10/107 709/206 |
| 2003/0221010 A1* | 11/2003 | Yoneya | G06F 16/58 709/227 |
| 2004/0078257 A1* | 4/2004 | Schweitzer | G06Q 10/06 705/7.21 |
| 2005/0021536 A1* | 1/2005 | Fiedler | G06Q 10/10 |
| 2005/0021557 A1* | 1/2005 | Brendle | G06Q 10/10 |
| 2005/0021998 A1* | 1/2005 | Fiedler | H04L 41/18 726/26 |
| 2007/0288623 A1* | 12/2007 | Kato | H04L 63/102 709/223 |
| 2008/0123854 A1* | 5/2008 | Peel | H04L 9/0894 380/277 |
| 2008/0154778 A1* | 6/2008 | Lee | G06F 21/10 705/51 |
| 2008/0168403 A1* | 7/2008 | Westerman | G06F 3/041 715/863 |
| 2011/0099194 A1* | 4/2011 | Trevor | G06F 16/24545 707/769 |
| 2011/0107101 A1* | 5/2011 | Funk | H04L 9/0822 713/170 |
| 2012/0158161 A1* | 6/2012 | Cohn | G08B 29/02 700/90 |
| 2012/0167160 A1* | 6/2012 | Carney | H04L 45/02 726/1 |
| 2012/0214441 A1* | 8/2012 | Raleigh | G06Q 20/102 455/406 |
| 2012/0304254 A1* | 11/2012 | Musfeldt | H04W 12/02 726/2 |
| 2013/0191650 A1* | 7/2013 | Balakrishnan | H04L 9/008 713/190 |
| 2014/0086177 A1* | 3/2014 | Adjakple | H04L 67/10 370/329 |
| 2014/0106704 A1* | 4/2014 | Cooke | G06F 9/546 455/405 |
| 2014/0143782 A1* | 5/2014 | Shekar | G06Q 10/06 718/100 |
| 2014/0156992 A1* | 6/2014 | Medin | H04L 51/04 713/168 |
| 2014/0164776 A1* | 6/2014 | Hook | G06F 21/6218 713/171 |
| 2014/0181954 A1* | 6/2014 | Robertson | G07C 9/257 726/17 |
| 2014/0189808 A1* | 7/2014 | Mahaffey | H04L 63/083 726/4 |
| 2015/0071139 A1* | 3/2015 | Nix | H04L 63/166 370/311 |
| 2015/0120374 A1* | 4/2015 | Kolegayev | G06Q 10/06316 705/7.26 |
| 2015/0193512 A1* | 7/2015 | No | G06F 16/25 715/810 |
| 2015/0256385 A1* | 9/2015 | Chandhok | H04L 41/18 715/734 |
| 2015/0349976 A1* | 12/2015 | Toutain | G05B 19/042 700/275 |
| 2015/0350031 A1* | 12/2015 | Burks | G06F 3/0482 715/736 |
| 2016/0034318 A1* | 2/2016 | Byreddy | G06F 9/5072 718/105 |
| 2016/0088109 A1* | 3/2016 | Chen | H04L 67/42 709/203 |
| 2016/0112240 A1* | 4/2016 | Sundaresan | H04W 4/90 726/1 |
| 2016/0218875 A1* | 7/2016 | Le Saint | H04L 9/0825 |
| 2016/0224279 A1* | 8/2016 | Kim | H04L 67/10 |
| 2016/0248847 A1* | 8/2016 | Saxena | H04L 12/2829 |
| 2016/0269440 A1* | 9/2016 | Hartman | H04L 9/14 |
| 2016/0344561 A1* | 11/2016 | Grajek | H04L 63/0823 |
| 2017/0006034 A1* | 1/2017 | Link, II | H04L 63/0272 |
| 2017/0078428 A1* | 3/2017 | Unter Ecker | H04W 4/80 |
| 2017/0098197 A1* | 4/2017 | Yu | G06Q 30/02 |
| 2017/0104816 A1* | 4/2017 | Yan | H04N 21/4821 |
| 2017/0141926 A1* | 5/2017 | Xu | H04L 9/3263 |
| 2017/0250931 A1* | 8/2017 | Ioannou | H04L 67/18 |
| 2017/0345420 A1* | 11/2017 | Barnett, Jr. | G10L 15/22 |
| 2017/0359188 A1* | 12/2017 | Lett | H04W 4/70 |
| 2018/0041586 A1* | 2/2018 | Ueda | H04L 12/2803 |
| 2018/0121321 A1* | 5/2018 | Standley | G06F 9/4411 |
| 2018/0137208 A1* | 5/2018 | Ricker | G06F 16/435 |
| 2018/0157703 A1* | 6/2018 | Wang | G06F 16/2453 |
| 2018/0167203 A1* | 6/2018 | Belenko | H04L 9/14 |
| 2018/0183578 A1* | 6/2018 | Chakrabarti | H04L 9/3247 |
| 2018/0204282 A1* | 7/2018 | Painter | G06Q 20/322 |
| 2018/0261071 A1* | 9/2018 | Cao | G08B 13/19613 |
| 2018/0287802 A1* | 10/2018 | Brickell | H04L 9/3263 |
| 2018/0300556 A1* | 10/2018 | Varerkar | G06N 3/0445 |
| 2018/0357097 A1* | 12/2018 | Poort | G06F 9/5027 |
| 2018/0359266 A1* | 12/2018 | Andow | H04L 63/1408 |
| 2019/0036678 A1* | 1/2019 | Ahmed | H04L 9/302 |
| 2019/0036723 A1* | 1/2019 | Miki | B25J 11/0005 |
| 2019/0065993 A1* | 2/2019 | Srinivasan | G06N 5/025 |
| 2019/0132930 A1* | 5/2019 | Vangeel | H05B 47/105 |
| 2019/0173685 A1* | 6/2019 | Gould | H04L 12/2827 |
| 2019/0222424 A1* | 7/2019 | Lindemann | H04L 63/0407 |
| 2019/0253243 A1* | 8/2019 | Zimmerman | H04L 9/3247 |
| 2019/0334716 A1* | 10/2019 | Kocsis | H04L 63/0442 |
| 2020/0074464 A1* | 3/2020 | Trevethan | H04L 9/0637 |
| 2020/0082060 A1* | 3/2020 | Steele | G06F 21/14 |
| 2020/0218590 A1* | 7/2020 | Jin | G06F 9/44505 |
| 2021/0018912 A1* | 1/2021 | Dymesich | G05D 1/0044 |

OTHER PUBLICATIONS

Brooks, Christopher, Chadlia Jerad, Hokeun Kim, Edward A. Lee, Marten Lohstroh, Victor Nouvelletz, Beth Osyk, and Matt Weber. "A component architecture for the internet of things." Proceedings of the IEEE 106, No. 9 (2018): 1527-1542. (Year: 2018).*

Mi, Xianghang, Feng Qian, Ying Zhang, and XiaoFeng Wang. "An empirical characterization of IFTTT: ecosystem, usage, and performance." In Proceedings of the 2017 Internet Measurement Conference, pp. 398-404. 2017. (Year: 2017).*

Panwar, Nisha, Shantanu Sharma, Guoxi Wang, Sharad Mehrotra, and Nalini Venkatasubramanian. "Canopy: A Verifiable Privacy-Preserving Token Ring-Based Communication Protocol for Smart Homes." ACM Transactions on Cyber-Physical Systems 5, No. 1 (2020): 1-34. (Year: 2020).*

Corno, Fulvio, Luigi De Russis, and Alberto Monge Roffarello. "A semantic web approach to simplifying trigger-action programming in the IoT." Computer 50, No. 11 (2017): 18-24. (Year: 2017).*

Nandi, Chandrakana, and Michael D. Ernst. "Automatic trigger generation for rule-based smart homes." In Proceedings of the 2016 ACM Workshop on Programming Languages and Analysis for Security, pp. 97-102. 2016. (Year: 2016).*

Fernandes et al.; "Decoupled-IFTTT: Constraining Privlege in Trigger-Action Platforms for the Internet of Things"; white paper; located at: https://arxiv.org/pdf/1707.00405.pdf; accessed on Sep. 27, 2018; 19 pages.

Fernandes et al.; "Decentralized Action Integrity for Trigger-Action IoT Platforms"; presented at Network and Distributed Systems Security (NDSS) Symposium 2018 on Feb. 18-21, 2018; located at: http://earlence.com/assets/papers/dtap_ndss18.pdf; accessed on Sep. 27, 2018; 16 pages.

Guha et al.; "Koi: A Location-Privacy Platform for Smartphone Apps"; white paper; located at: https://css.csail.mit.edu/6.858/2017/readings/koi.pdf; accessed on Sep. 27, 2018; 14 pages.

Princeton SNS Group; "Untrusted Cloud Services"; webpage; located at:http://sns.cs.princeton.edu/projects/untrusted-cloud/; accessed on Sep. 27, 2018; 2 pages.

Zhao et al.; "Trusted Data Sharing over Untrusted Cloud Storage Providers"; webpage; located at: https://pdfs.semanticscholar.org/838b/cf537254b4f2684adde1e438af2f09faa27c.pdf; accessed on Sep. 27, 2018; 7 pages.

(56) References Cited

OTHER PUBLICATIONS

Boneh et al.; "Hosting Services on an Untrusted Cloud"; presented at International Association for Cryptologic Research; 2015; white paper; 33 pages.

* cited by examiner

PRIVACY PRESERVING SECURE TASK AUTOMATION

BACKGROUND

Many aspects of users' lives are controlled by online services and automation, which may link a user's identity with computing devices and online tools, including productivity tools, smart home automation, social networking, work networks, Internet-of-Things activities, etc. Many of these services and automations are more useful, or have added benefits, when multiple devices and services can be combined to automate one or more tasks.

A trigger-action or task automation platform is a web-based service that allows users to specify or define automation rules by combining multiple online services with respect to the user's digital data, physical devices, social networks, and the like. In some cases, an automation rule may be defined by a trigger and a trigger-based action. The trigger may be an event associated with a service, and the action may be a function activated over a service based on the occurrence of the trigger. For example, a user may create a rule that requests a smart lighting system at home to turn the lights on in the kitchen when another system detects the user is approaching the home (e.g., by way of geofence detection or GPS-tracking on a user device).

In order to execute a task automation rule, however, a computing platform (e.g., a smartphone, a smart home lighting system, a social media application, etc.) may require information related to the rule (trigger and action) and the user, including the need for potentially sensitive information such as names, Social Security numbers, addresses, phone numbers, passwords, personal habits, preferences, and the like. On the chance that a malicious attacker gains access to the task automation rules, the attacker may be able to gain valuable, and sensitive, information about a user including information which may increase both the online and offline security risks for the user.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for privacy preserving secure task automation may be performed, at least in part, by a computing system comprising one or more processors. The method may include generating, by a first section of a task automation platform, a pair of encryption keys including a private key and a shared secret key; receiving, by a second section of the task automation platform, data related to a user of the task automation platform; receiving, by the second section, data related to a user of a trigger service; receiving data related to the user of an action service, wherein the user of the action service, user of the trigger service, and user of the task automation platform are the same user; sending the shared secret key to the trigger service and the action service; storing the private key in the first section; receiving from the trigger service, by the second section, a first encrypted communication regarding an occurrence of a trigger, wherein the first encrypted communication is encrypted with the shared secret key, the trigger is part of a rule comprising the trigger and an action, and the rule is stored in an encrypted database on the task automation platform; determining, by the first section, that the trigger corresponds to the user of the task automation platform; encrypting a second message with the shared secret key, the second encrypted message requesting an invocation of the action based on the occurrence of the trigger; and transmitting the second encrypted message to the action service, the second encrypted message being transmitted without the data related to the user of the task automation platform.

Data related to the user of the task automation platform may include, but is not limited to, a username, a password, a name, a Social Security Number, an address, a phone number, work information, daily habits, home security data, biometric data, or medical data, or a combination thereof.

In some embodiments, the first section of the task automation platform may be a network enclave, where the network enclave may be a hardware-secured environment.

In some embodiments, the method may further include receiving user input from a client device associated with the user, the client device executing a task automation software application and wherein the user input establishes the rule.

In some embodiments, the method may further include encrypting the data related to the user of the task automation platform; and storing the data related to the user of the task automation platform in an encrypted database associated with the task automation platform. The encrypted database may include a CryptDB database.

The method may further include decrypting, by the first section, the first encrypted communication using the private key; associating the user of the task automation platform with the user of the trigger service; determining the action for the trigger based on the first encrypted communication; and associating the user of the trigger service with the user of the action service.

The method may further include decrypting application programming interface (API) parameters to retrieve user data related to the user of a trigger service; and generating an encrypted query to the encrypted database to associate the user of the trigger service with the user of the task automation platform. The method may further include querying the encrypted database using a SQL-aware encryption scheme.

In some embodiments, a computer device may be described, the computer device including a processor, a memory in electronic communication with the processor, instructions stored in the memory, the instructions being executable by the processor to perform the steps of the method for privacy preserving secure task automation.

The method may include establishing an account with a task automation platform for a user; establishing an automation rule with the task automation platform, the rule comprising a trigger and an action to be invoked upon occurrence of the trigger; authorizing a trigger service associated with the trigger to provide data of the user with the task automation platform; and authorizing an action service associated with the action to provide data of the user to the task automation platform.

In some embodiments, the method may include authorizing using a token-based authorization protocol, wherein the token-based authorization protocol enables the task automation platform to access data about the user from the trigger service, the action service, or a combination thereof. In some embodiments, the token-based authorization protocol may be an Open Authorization (OAuth) standard.

In some embodiments, one or more non-transitory computer-readable media may include one or more computer-readable instructions that, when executed by one or more computing devices, cause the one or more computing devices to perform the method for privacy preserving secure task automation.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
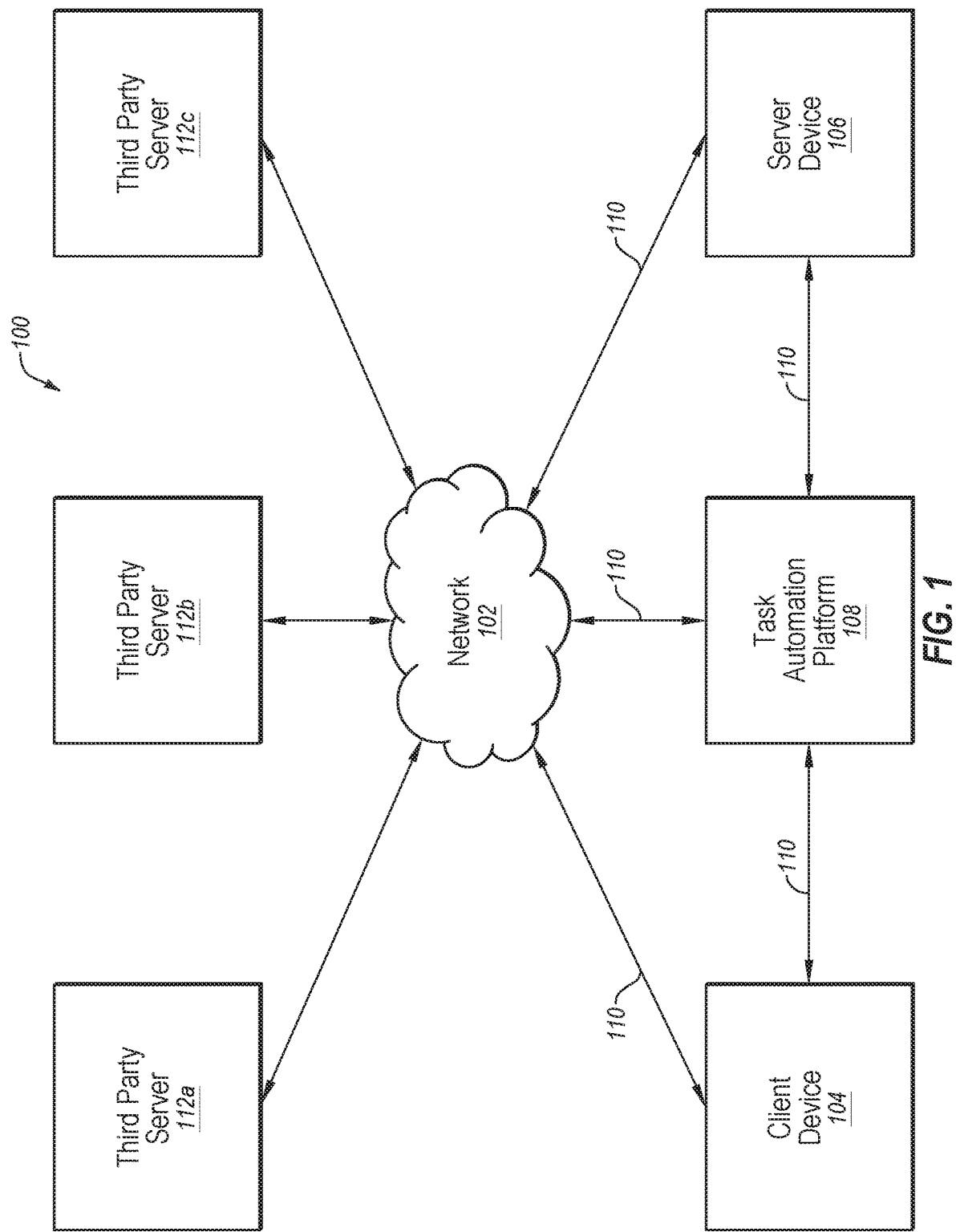
FIG. 1 illustrates an example system configured for privacy preserving secure task automation.

Currently, users are offered the opportunity to use a myriad of online services to streamline and automate aspects of their lives. For example, users may have cloud-based storage accounts, web-based email, social media, online address books, photography databases and sharing services, networking services, media streaming accounts, home automation and security, etc., each of which may use a computing platform to automate a task for the user. In addition, a user may have at least one Internet of Things (IoT) physical device (e.g., a smart lighting system, smart kitchen, audio/video security system, medical and biometric tracking, GPS tracking, etc.) to help automate aspects of home life, work life, transportation, medical issues, etc. As the number of devices and services continues to grow, the ability to combine several devices and services for increased and more efficient automation also continues to grow. Thus, the computing platform may be a task automation platform, such as IFTTT® (If This Than That) or ZAPIER®, which may aid in automating rules established by a user.

More specifically, task automation platforms may enable trigger-action based online services to support automation tasks. For example, a user may establish a rule to blink a smart light bulb when the user is tagged in a social media post. Other examples include, but are not limited to, the user establishing a rule to save a photograph taken on the user's smartphone to a cloud-based storage service when the user uploads the photograph to a social media platform; automatically muting a smartphone when the smartphone is determined to be within a specific location (e.g., a conference room or theater); and triggering an automatic phone call to the user himself when the user is experiencing an awkward situation, etc.

Task automation may use existing task automation platforms to integrate multiple automation services. In some cases, a task automation platform may enable a channel, a trigger, an action, and a rule. The channel may be a module that communicates with an online service using a Representational State Transfer (REST) application programming interface (API). In some cases, the channel may gain access to online service APIs by acquiring an authentication and authorization token during a channel connection step (e.g., an OAuth token). An OAuth token may be used to allow a user's account information to be used by a third-party service without providing the user's password.

A trigger may be established that associates a defined event with an action and/or a service; for example, a trigger may be determining that a door has changed from a locked to an unlocked state, or that a house that was previously unoccupied is now occupied. There may be multiple types of triggers, including polling-based, callback-based, and a hybrid trigger. For a polling-based trigger, the task automation platform may call the third-party service's API for every user on a periodic basis. Polling-based triggers may not be efficient for real-time actions. For a callback-based trigger, the trigger service may invoke the task automation platform's API to deliver the triggers. The callback-based trigger may be more useful for implementing real-time responses to events. For the hybrid trigger, the trigger service may use the task automation platform's API to notify the users when new events are available, and the task automation platform may then poll the available events from a service provider associated with the trigger (i.e., a trigger service).

An action may be a function associated with a service; for example, the action may be to turn the lights on in an entryway. A rule may connect the trigger with the action; for example, when the door changes from locked to unlocked (the trigger), turn the lights on in the entryway (the action). With the action, the task automation platform may use the API of a service provider associated with the action (i.e., an action service) to perform the action.

The security of the user's online services and physical devices when using a task automation platform, however, is a constant concern. The task automation platform may be compromised by different types of attackers including, but not limited to, malicious administrators, untrusted cloud providers, and adversaries that exploit software vulnerabilities. The security implications of compromise may result in an attacker misusing access tokens to compromise the confidentiality and integrity of a user's data, or to remotely control the user's physical devices for sabotage or espionage. A user's privacy is also at risk because the attacker can passively observe the user's data, online services, physical devices, automation rules, trigger events (e.g., the user is away from home), and events or action parameters (e.g., private documents, online postings, images, videos, etc.) in order to obtain more information about a user. Current solutions may not specifically address the security risk of handling access tokens, and the privacy of users' data, including automation rules, triggers, actions, etc. may be at risk. Thus, a task automation platform and method is provided that protects the security and privacy of users' data and online services even if the task automation platform is compromised by attacker.

Turning to the figures, FIG. 1 illustrates an example system 100 configured for privacy preserving secure task automation. The system 100 may include a network 102, a client device 104, and a server device 106. In some embodiments, the system 100 may further include a task automation platform 108. Task automation platform 108 may be a standalone computer device, whereas in additional or alternative embodiments, the server device 106 and/or the client device 104 may be configured to execute computer code associated with the task automation platform 108.

In some embodiments, the network 102 may be configured to communicatively couple the client device 104, the server device 106, and/or the task automation platform 108 via communication connections 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
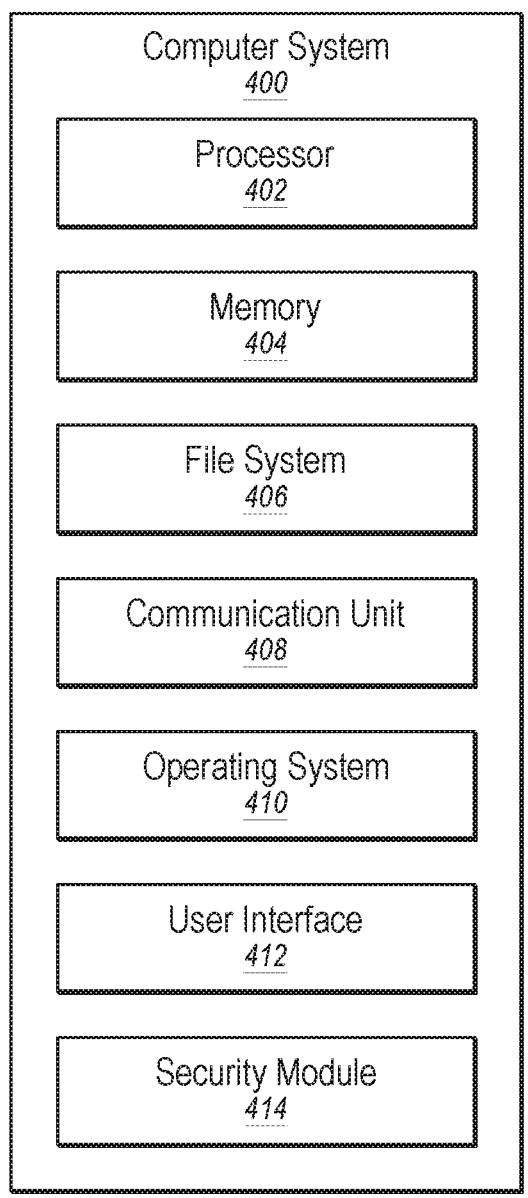
FIG. 4 illustrates an example computer system that may be employed in privacy preserving secure task automation.

In some embodiments, the client device 104 may be any computer system capable of communicating over the network 102 and capable of privacy preserving secure task automation, examples of which are disclosed herein in connection with the computer system 400 of FIG. 4. Similarly, in some embodiments, the server device 106 may be any computer system capable of communicating over the network 102 and capable of privacy preserving secure task automation, examples of which are disclosed herein in connection with the computer system 400 of FIG. 4.

In some embodiments, the system 100 may also include third party servers 112a, 112b, and 112c, which may be examples of servers associated with third party trigger services and action services described in more detail with reference to FIG. 2. Third party servers 112a-112c may be in communication with any of the client device 104, server device 106, and task automation platform 108 either directly or indirectly by way of network 102 and/or communication connections 110.

In some embodiments, actions associated with task automation platform 108 may be implemented in conjunction with any malware detection system or endpoint security application, such as, but not limited to, Symantec's Targeted Attack Analytics (TAA) technology, Symantec Endpoint Protection's (SEP), etc.

The task automation platform 108 may be designed to make it difficult or impossible for specific users (and characteristics related to users) to be linked to a rule, trigger, action, trigger service, and/or action service. More specifically, using the task automation platform 108 described herein, an attacker may be able to access automation rules (including triggers and actions), but the triggers and actions associated with the rules may not be liked with a specific service or with a specific user based on the design of the task automation platform 108 and how the platform handles communications and encryption. The task automation platform 108 may be enabled to hide privacy sensitive API parameters, access tokens automation rules, and the like, using encryption to hide the data both at rest and in transit between the task automation platform 108 and the services 204 and/or 206. A trusted platform 214 may be a hardware secured environment enabled to access encrypted data, as well as to evaluate rule conditions associated with the task automation platform 108.

Figure 2:
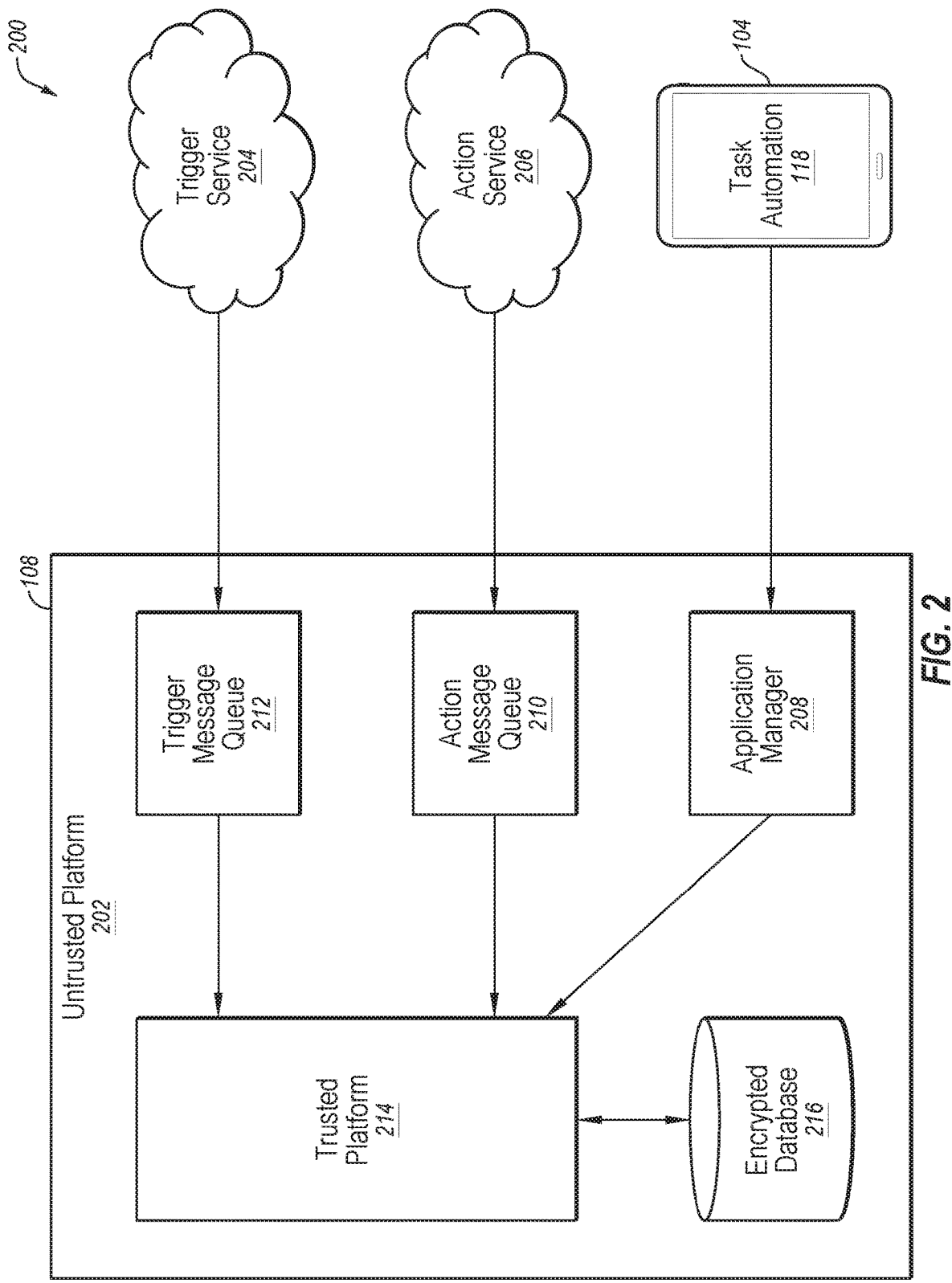
FIG. 2 illustrates an example architecture related to privacy preserving secure task automation.

FIG. 2 illustrates an example architecture 200 related to privacy preserving secure task automation. The architecture 200 may include task automation platform 108, trigger service 204, action service 206, and client device 104. Task automation platform 108 and client device 104 may be the same platform and device, respectively, described with reference to FIG. 1. The task automation platform may include an untrusted platform 202 portion and a trusted platform 214 portion. The untrusted platform 202 may include modules or components that enable an action message queue 210, a trigger message queue 212, an app manager 208, and an encrypted database 216. Action message queue 210 and trigger message queue 212 may store outgoing action messages and incoming trigger messages, respectively.

Encrypted database 216 may store automation rules established by the user including, but not limited to, at-rest data such as user information, application information, billing information, habits, preferences, passwords, mapping between trigger and/or action services users and task automation platform users, mapping between task automation platform users and automation rules, and the like. In some embodiments, the encrypted database may allow queries on the encrypted data using SQL-aware encryption schemes; however, in some embodiments, the encrypted database may utilize a database proxy with access to plaintext data in order to generate encryption specific queries. In one embodiment, the encrypted database may be a CryptDB database.

In addition, the client device 104 may be running a task automation application ("app") 118, which may enable the user to enable the task automation platform 108 to associate the user with the trigger service 204 and/or action service 206.

Operating within or in conjunction with the untrusted platform is the trusted platform 214. Trusted platform 214 may be an allocated private region of memory also known as an enclave, where the trusted platform may be protected from processes running at higher privilege levels. Trusted platform 214 may perform light computational tasks associated with accessing encrypted data from the encrypted database 216, as well as evaluating rule conditions on the trigger parameters. The trusted platform 214 may be a hardware-secured environment such as, but not limited to, INTEL®'s Software Guard Extensions (SGX) or AMD®'s Secure Encrypted Virtualization (SEV). Although SGX and SEV are provided as examples, any enclave based code environments may be contemplated.

In one embodiment, a user may establish an account with trigger service 204. For example, trigger service 204 may be the INSTAGRAM® application. Thus, the user may establish an INSTAGRAM® account with an associated user name, password, user information (e.g., name, address, phone number, email address, billing information, location, additional personal information, etc.). Other information regarding the user may be provided to the trigger service 204, such as geolocation information. In addition, the user may establish an account with action service 206. For example, action service 206 may be the DROPBOX™ application. As with the trigger service 204, the user may provide the action service 206 with information such as an associated user name, password, user information (e.g., name, address, phone number, email address, billing information, location, additional personal information, etc.).

Thus, the user may establish an account with both the trigger service 204 and the action service 206 independently of each other. If the user wishes to automate a portion of his or her life using a trigger service 204 and an action service 206, the user may establish a task automation account with the task automation platform 108. In one embodiment, the user may download the task automation app 118 to the client device 104, where the task automation app 118 is associated with the task automation platform 108.

The task automation app 118 running on the client device may communicate with the app manager 208. The app manager 208 may facilitate procedures and communications within the task automation platform 108. The user may interact with the task automation app 118 to establish a user account with the task automation platform 108. As with the trigger service 204 and action service 206, the user may provide information to the task automation platform 108 such as a user name, password, and user information (e.g., name, address, phone number, email address, billing information, permission to access client device 104 data and location information). Furthermore, the user may use the task automation app 118 to establish an automation rule. For example, the user may interact with the task automation app 118 to set up a rule that every time the user uploads a photograph to INSTAGRAM® (e.g., the trigger), then the same photograph should be uploaded to DROPBOX™ (e.g., the action).

In some embodiments, the task automation platform 108 may use asymmetric cryptography to generate a shared secret key and private key pair. In particular, the trusted platform 214 may generate master and derived keys in order to encrypted data stored in the encrypted database 216, as well as to encrypt communications between the task automation platform 108 and the services 204 and/or 206, as well as communications between the client device 104 and the task automation platform 108.

The private key generated by the trusted platform 214 may be stored on the trusted platform 214, with the shared secret key stored on the encrypted database 216; as such, the untrusted platform 202 may not have access to the private key. In one embodiment, the encryption keys may be protected using INTEL®'s SGX sealing capabilities. For example, SGX may enable encryption of data using a key that is unique to the trusted platform 214.

The untrusted platform 202 may exchange the shared secret keys with the trigger service 204 and the action service 206 using certificates established when the user established an account with each respective service. For example, the shared secret keys may be exchanged between the task automation platform 108 and each service 204 and/or 206 using X509 certificates. Furthermore, the task automation platform 108 may use certificates signed by a third party certificate authority. As a result, the untrusted platform 202 may not perform man-in-the-middle attacks in order to decrypt the encrypted traffic between the services 204 and/or 206 and the trusted platform 214.

In order to facilitate implementation of the rules, the user must authorize each trigger service 204 and action service 206 to act automatically on the user's behalf. Thus, the user may first request a channel connection to the task automation platform 108. The task automation platform 108 may request an authorization code from the trigger service 204 and the action service 205, in order to access data related to the user. In turn, the trigger service 204 and the action service 206 may request authorization from the user to grant the task automation platform 108 access to the user's respective accounts. The user grants the trigger service 204 and the action service 206 permission to exchange user data with the task automation platform 108, which results in each service 204 and 206 sending the task automation platform 108 an authorization token. The authorization may be facilitated by way of an authorization protocol such as, but not limited to OAuth.

When the user establishes a rule through the task automation platform 108, the user may define a trigger and a related action. In an additional or alternative embodiment, the task automation platform 108 may have default or administrator-defined triggers and/or actions that the user may select from. The trigger events may be associated with sensitive and personal information about the user, including identifying information, habits, likes and dislikes, associations, passwords, etc. Once the rule is established, the task automation platform 108 may determine that the trigger has occurred. For example, if the trigger is uploading a photograph to INSTAGRAM®, the trigger service 204 may send a communication to the task automation platform 108 (e.g., trigger message queue 212) that the trigger has occurred. The task automation platform 108 may then invoke the API using a trigger API server hosted in the untrusted platform 202. Sensitive parameters associated with the API (e.g., usernames, passwords, file names, text, location data) may be encrypted using a shared secret key that has been shared between the trusted platform 204 and the trigger service 204.

The API server creates a message related to the trigger event and may add the message to the trigger message queue 212. Thus, in some embodiments, trigger message queue 212 may capture data related to each of the trigger events received from trigger service 204. Trigger messages sent from the trigger service 204 to the trigger message queue 212 may be communicated over network 102 to the task automation platform 108, and may encrypted using the shared secret keys generated by the trusted platform 214.

The trusted platform 214 may continuously process incoming messages from the trigger message queue 212, and in response, may generate corresponding outgoing action messages, with the outgoing action messages being added to the action message queue 210. During this process, the trusted platform 214 may first decrypt the encrypted API parameters in order to retrieve user information corresponding to the trigger service 204. Using the encrypted database 216 proxy, the trusted platform 214 may generate an encrypted query to identify the user associated with the task automation platform 108 (and thus the rule associated with the incoming trigger message), in order to retrieve the trigger-related automation rule data for the user.

The trusted platform 214 then evaluates the trigger conditions and generates one or more action messages in response. For example, the trigger condition may be evaluated to determine that a photograph has been uploaded by the identified user to the user's INSTAGRAM® account and that there is an associated rule with the trigger. Data related to the task automation platform 108, however, may be stored in the encrypted database 216. When the trigger message is received by the trigger message queue 212, the trusted platform 214 may use the private encryption key to decrypt the message, as well as decrypted data stored in the encrypted database 216. Thus, only the trusted platform 214 is able to link the trigger service 204 user to the task automation platform 108 and the appropriate automation rule.

Upon evaluating the trigger, the trusted platform 214 may determine that the specific user is associated with the trigger, and that the identified user is associated with an action service and an associated action. The action, like the trigger is linked to sensitive parameters related to the user. Thus, before sending a message to the action service 206, the trusted platform 214 may encrypt the sensitive parameters associated with the action using the shared secret key generated by the trusted platform 214 and shared with the action service 206.

The trusted platform 214 may then send the message to the action message queue 210. In some embodiments, action message queue 210 may receive an indication from the trusted platform 114 that a trigger has occurred and that a responsive action is needed. Thus action message queue 210 communicates with action service 206 to invoke the action based on the trigger. The action service 206, however, does not receive sensitive data associated with the task automation platform 108 user. Thus, an attacker intercepting a communication between the task automation platform 108 and the action service 206 (or alternatively between the trigger service 204 and the task automation platform 108), would not be able to link the task automation platform 108 user (and automation rule parameters), with either the user of the action service 206 or the trigger service 204.

Action messages sent from the action message queue 210 to action service 206 may be communicated over network 102 from the task automation platform 108, and may be encrypted using the shared secret keys generated by the trusted platform 214. In some embodiments, the action API may process the messages in the action message queue 210 in order to invoke the action APIs on the action service 206.

Figure 3A:
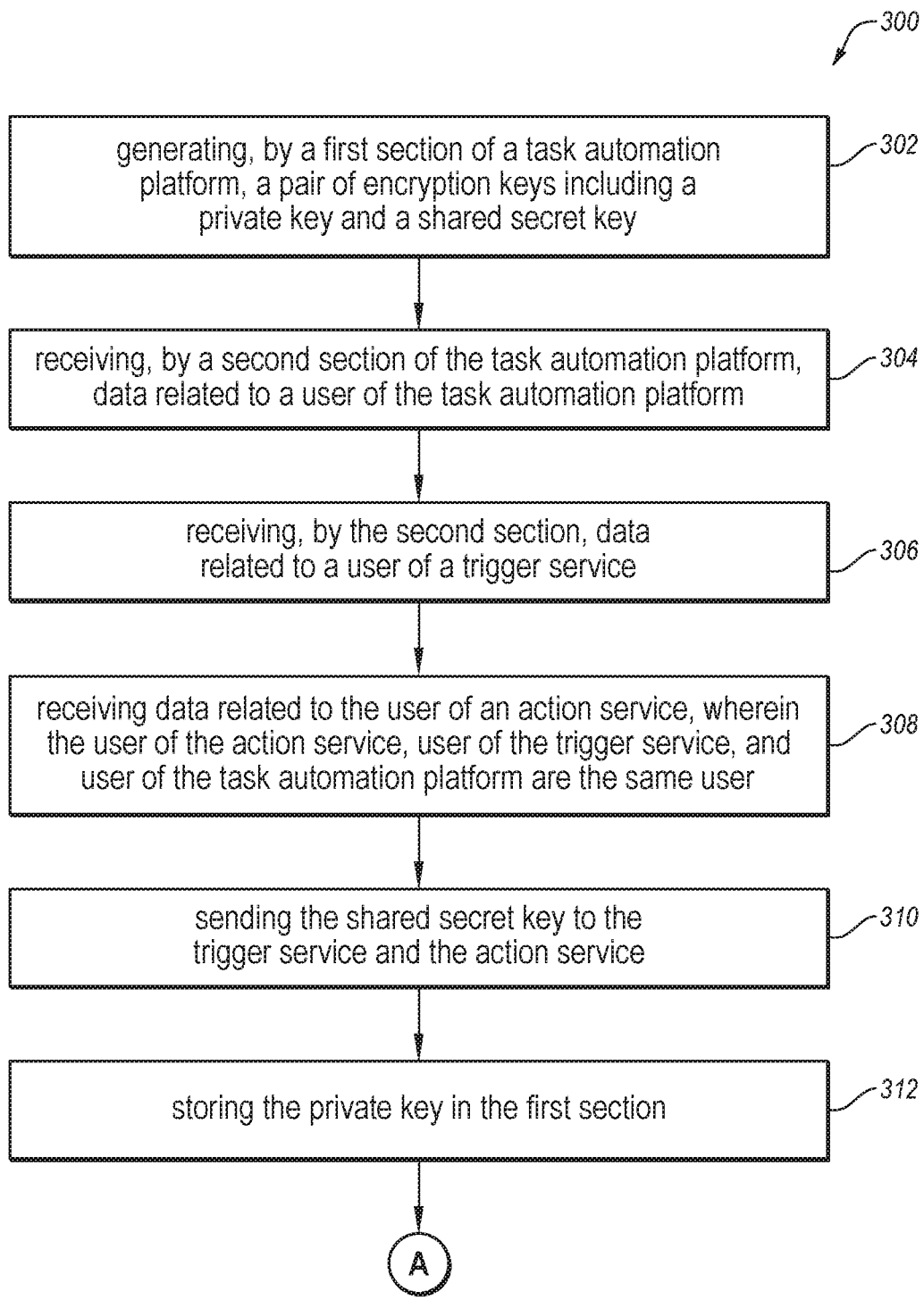
FIGS. 3A-3B illustrate a flowchart of an example method for privacy preserving secure task automation.
Figure 3B:
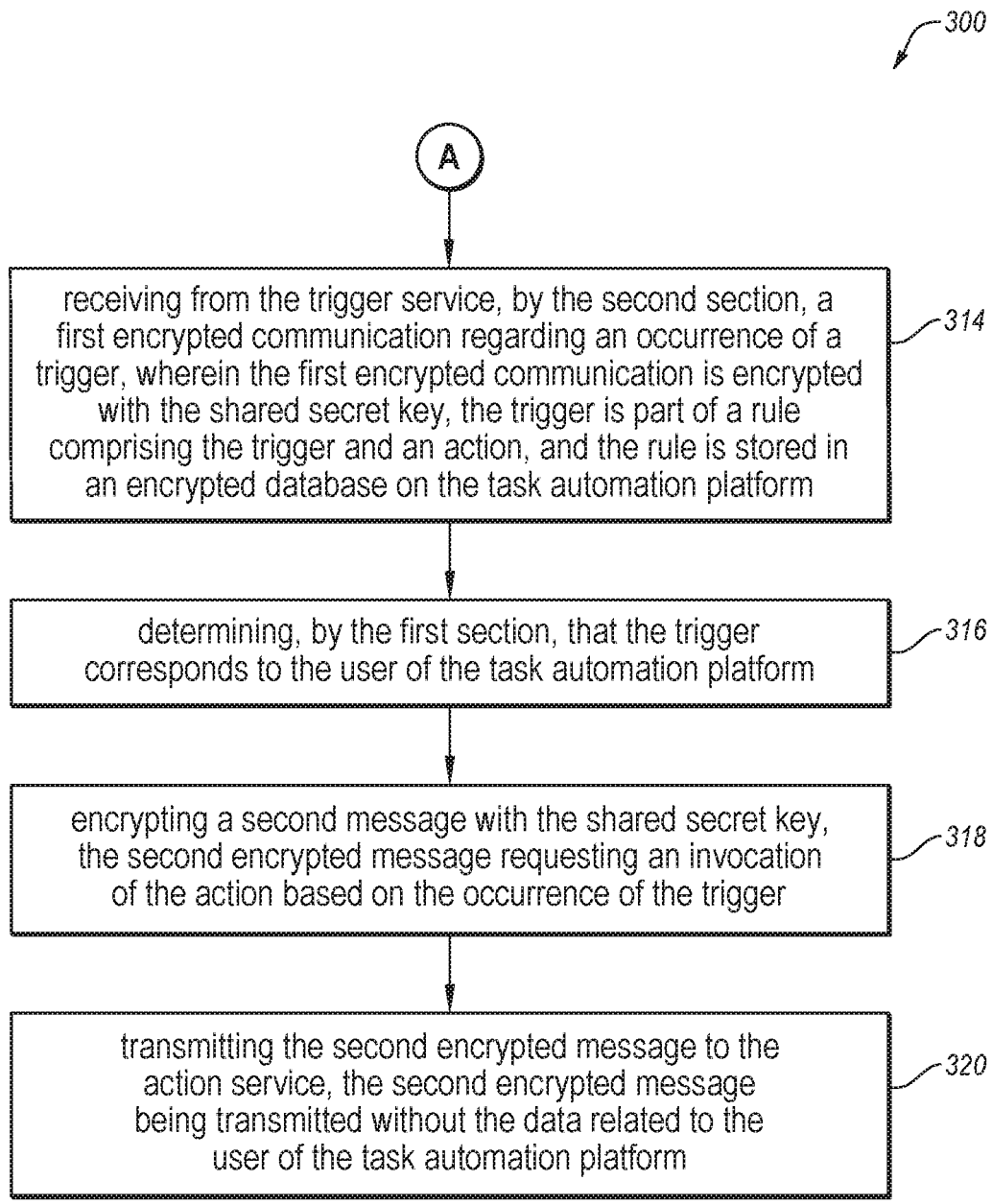

FIGS. 3A-3B illustrate a flowchart of an example method for privacy preserving secure task automation. The method 300 may be performed, in some embodiments, by a device or system, such as by client device 104, server device 106, and/or task automation platform 108 executing independently or on one of the other described devices. In these and other embodiments, the method 300 may be performed by one or more processors based on one or more computer-readable instructions stored on one or more non-transitory computer-readable media. The method 300 will now be described in connection with FIGS. 1 and 2.

The method 300 may include, at action 302, generating, by a first section of a task automation platform, a pair of encryption keys including a private key and a shared secret key. For example, the trusted platform 214 may generate the private key and the shared secret key using asymmetric cryptography algorithms.

The method 300 may include, at action 304, receiving data, by the second section, data related to a user of the task automation platform. For example, the untrusted platform 202 may receive information related to a user establishing an account with the task automation platform for purposes of creating automation rules.

The method 300 may include, at action 306, receiving data, by the second section, related to the user of a trigger service. For example, the task automation platform 108 may receive an authorization token to obtain information about a user of a trigger service, where the user of the trigger service is the same user having established an account with the task automation platform. Information may include data related to the trigger, a username, password, personal information about the user, billing information, habits, location data, and the like.

The method 300 may include, at action 308, receiving data related to the user of an action service, wherein the user of the action service, user of the trigger service, and user of the task automation platform are the same user. For example, the task automation platform 108 may receive an authorization token to obtain information about a user of an action service, where the user of the action service is the same user having established an account with the task automation platform, and the same user that has established an account with the trigger service. Information may include data related to the action, a username, password, personal information about the user, billing information, habits, location data, and the like.

The method 300 may include, at action 310, sending the shared secret key to the trigger service and the action service. For example, the trusted platform 204 may send the shared secret key to the trigger service and the action service.

The method 300 may include, at action 312, storing the private key in the first section. For example, the private key may be stored in the trusted platform 214.

The method 300 may include, at action 314, receiving, from the trigger service to the second section, a first encrypted communication regarding an occurrence of a trigger, the first encrypted communication is encrypted with the shared secret key, wherein the trigger is part of a rule comprising the trigger and an action, the rule stored in an encrypted database on the task automation platform. For example, the untrusted platform 202 may receive a communication from the trigger service that indicates the trigger has occurred. The communication may include data about the trigger and about the user of the trigger service, and may be encrypted using the shared secret key generated by the trusted platform 214.

The method 300 may include, at action 316, determining, by the first section, that the trigger corresponds to the user of the task automation platform. For example, the trusted platform 214 may compare and analyze the data received about the trigger and the user of the trigger service, with data stored in the encrypted database to find a match between the user of the trigger service, and the user of the task automation platform.

The method 300 may include, at action 318, encrypting a second message with the shared secret key, the second encrypted message requesting an invocation of the action based on the occurrence of the trigger. For example, the trusted platform 214 may encrypted the message using the shared secret key after determining which action service will perform the action determined to be associated with the occurrence of the trigger.

The method 300 may include, at action 320, transmitting the second encrypted message to the action service, the second encrypted message transmitted without the data related to the user of the task automation platform. For example, the second encrypted message is sent to the action service 206 without any link between the user of the trigger service 204, the user of the task automation platform 108, and the action service 206, thus, protecting the secure information of the user between each of the services and platforms.

Although the actions of the method 300 are illustrated in FIG. 3 as discrete actions, various actions may be divided into additional actions, combined into fewer actions, reordered, expanded, or eliminated, depending on the desired implementation.

Further, it is understood that the method 300 may improve the functioning of a computer system itself. For example, the functioning of the task automation platform 108 on the client devices or the server device 106 may itself be improved by the method 300. In some embodiments, the method 300 may improve throughput and latency issues. In yet still other embodiments, the method 300 may provide an advantage to the user by eliminating a link between the user's private or sensitive characteristics and triggers and actions. Eliminating the link protects the user's offline and online privacy by not giving an attacker information about the user if the attacker manages to intercept information about an automation rule (i.e., a trigger and/or an action).

FIG. 4 illustrates an example computer system 400 that may be employed in privacy preserving secure task automation. In some embodiments, the computer system 400 may be part of any of the systems or devices described in this disclosure. For example, the computer system 400 may be part of the client device 104, the server device 106, and/or the task automation platform 108 of FIG. 1.

The computer system 400 may include a processor 402, a memory 404, a file system 406, a communication unit 408, an operating system 410, a user interface 412, and a module

414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more applications, such as task automation platform 108, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as task automation platform 108 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for privacy preserving secure task automation, at least a portion of the method being performed by a computing device comprising one or more processors, the method comprising:
    generating, by a first section of a task automation platform, a pair of encryption keys including a private key and a shared secret key;
    receiving, by a second section of the task automation platform, data related to a user of the task automation platform;
    encrypting the data related to the user of the task automation platform;
    storing the data related to the user of the task automation platform in an encrypted database associated with the task automation platform;
    receiving, by the second section, data related to a user of a trigger service;
    receiving data related to a user of an action service, wherein the user of the action service, user of the trigger service, and user of the task automation platform are the same user;
    storing a rule on the task automation platform that identifies an action to be taken at the action service upon an occurrence of a trigger at the trigger service;
    sending the shared secret key to the trigger service and the action service;
    storing the private key in the first section;
    receiving from the trigger service, by the second section, a first encrypted communication that the trigger has occurred, wherein the first encrypted communication is encrypted with the shared secret key;
    determining, by the first section, that the trigger corresponds to the user of the task automation platform, wherein the determining further comprises:
    decrypting, by the first section, the first encrypted communication to identify the trigger;
    associating the user of the task automation platform with the user of the trigger service;
    determining, based on the rule, the action to be taken upon the occurrence of the trigger; and
    associating the user of the trigger service with the user of the action service;
    encrypting a second message with the shared secret key, the second encrypted message requesting an invocation of the action to be taken upon the occurrence of the trigger; and
    transmitting the second encrypted message to the action service, the second encrypted message being transmitted without any link connecting the user of the action service to the trigger service.

2. The method of claim 1, wherein the first section of the task automation platform is a network enclave.

3. The method of claim 2, wherein the network enclave is a hardware-secured environment.

4. The method of claim 1, wherein receiving data related to the user of the task automation platform further comprises:
receiving user input from a client device associated with the user, the client device executing a task automation software application and wherein the user input establishes the rule.

5. The method of claim 1, wherein storing the data in the encrypted database further comprises:
storing the data in a CryptDB database.

6. The method of claim 1, wherein associating the user of the task automation platform with the user of the trigger service further comprises:
decrypting application programming interface (API) parameters to retrieve user data related to the user of the trigger service; and
generating an encrypted query to the encrypted database to associate the user of the trigger service with the user of the task automation platform.

7. The method of claim 6, wherein generating the encrypted query further comprises:
querying the encrypted database using a SQL-aware encryption scheme.

8. The method of claim 1, wherein the data related to the user of the task automation platform comprises a username, a password, a name, a Social Security Number, an address, a phone number, work information, daily habits, home security data, biometric data, or medical data, or a combination thereof.

9. One or more non-transitory computer-readable media comprising one or more computer readable instructions that, when executed by one or more processors of a computing device, the computing device having a task automation platform with a first section and a second section, causing the computing device to perform a method for privacy preserving secure task automation, the method comprising:
generating, by a first section of a task automation platform, a pair of encryption keys including a private key and a shared secret key;
receiving, by a second section of the task automation platform, data related to a user of the task automation platform;
encrypting the data related to the user of the task automation platform;
storing the data related to the user of the task automation platform in an encrypted database associated with the task automation platform;
receiving, by the second section, data related to a user of a trigger service;
receiving data related to a user of an action service, wherein the user of the action service, user of the trigger service, and user of the task automation platform are the same user;
storing a rule on the task automation platform that identifies an action to be taken at the action service upon an occurrence of a trigger at the trigger service;
sending the shared secret key to the trigger service and the action service;
storing the private key in the first section;
receiving from the trigger service, by the second section, a first encrypted communication that the trigger has occurred, wherein the first encrypted communication is encrypted with the shared secret key;
determining, by the first section, that the trigger corresponds to the user of the task automation platform, wherein the determining further comprises:
decrypting, by the first section, the first encrypted communication to identify the trigger;
associating the user of the task automation platform with the user of the trigger service;
determining, based on the rule, the action to be taken upon the occurrence of the trigger; and
associating the user of the trigger service with the user of the action service;
encrypting a second message with the shared secret key, the second encrypted message requesting an invocation of the action to be taken upon the occurrence of the trigger; and
transmitting the second encrypted message to the action service, the second encrypted message being transmitted without any link connecting the user of the action service to the trigger service.

10. The one or more non-transitory computer-readable media of claim 9, wherein receiving data related to the user of the task automation platform further comprises:
receiving user input from a client device associated with the user, the client device executing a task automation software application and wherein the user input establishes the rule.

11. The one or more non-transitory computer-readable media of claim 9, wherein associating the user of the task automation platform with the user of the trigger service further comprises:
decrypting encrypted application programming interface (API) parameters to retrieve user data related to the user of the trigger service; and
generating an encrypted query to the encrypted database to associate the user of the trigger service with the user of the task automation platform.

12. The one or more non-transitory computer-readable media of claim 11, wherein generating the encrypted query further comprises:
querying the encrypted database using a SQL-aware encryption scheme.

13. The one or more non-transitory computer-readable media of claim 9, wherein the data related to the user of the task automation platform comprises a username, a password, a name, a Social Security Number, an address, a phone number, work information, daily habits, home security data, biometric data, or medical data, or a combination thereof.

14. A system for protecting sensitive data from being exposed in graph embedding vectors, the system comprising:
a memory storing programmed instructions; and
a processor configured to execute the programmed instructions to:
generate, by a first section of a task automation platform, a pair of encryption keys including a private key and a shared secret key;
receive, by a second section of the task automation platform, data related to a user of the task automation platform;
encrypt the data related to the user of the task automation platform;
store the data related to the user of the task automation platform in an encrypted database associated with the task automation platform;
receive, by the second section, data related to a user of a trigger service;

receive data related to a user of an action service, wherein the user of the action service, user of the trigger service, and user of the task automation platform are the same user;

store a rule on the task automation platform that identifies an action to be taken at the action service upon an occurrence of a trigger at the trigger service;

send the shared secret key to the trigger service and the action service;

store the private key in the first section;

receive from the trigger service, by the second section, a first encrypted communication that the trigger has occurred, wherein the first encrypted communication is encrypted with the shared secret key;

determine, by the first section, that the trigger corresponds to the user of the task automation platform, wherein to determine that the trigger corresponds to the user of the task automation platform, the processor is further configured to execute programmed instructions to:

decrypt, by the first section, the first encrypted communication to identify the trigger;

associate the user of the task automation platform with the user of the trigger service;

determine, based on the rule, the action to be taken upon the occurrence of the trigger; and associate the user of the trigger service with the user of the action service;

encrypt a second message with the shared secret key, the second encrypted message requesting an invocation of the action to be taken upon the occurrence of the trigger; and transmit the second encrypted message to the action service, the second encrypted message being transmitted without any link connecting the user of the action service to the trigger service.

15. The system of claim 14, wherein the encrypted database is a CryptDB database.

16. The system of claim 14, wherein to associate the user of the task automation platform with the user of the trigger service, the processor is further configured to execute programmed instructions to:

decrypt application programming interface (API) parameters to retrieve user data related to the user of the trigger service; and generate an encrypted query to the encrypted database to associate the user of the trigger service with the user of the task automation platform.

17. The system of claim 16, wherein to generate the encrypted query, the processor is further configured to execute programmed instructions to:

query the encrypted database using a SQL-aware encryption scheme.

* * * * *